(12) United States Patent
Shih et al.

(10) Patent No.: US 8,786,671 B2
(45) Date of Patent: Jul. 22, 2014

(54) DRIVING RECORDER SYSTEM AND METHOD THEREOF

(71) Applicant: dadny Inc., Taipei (TW)

(72) Inventors: Daniel Shih, Taipei (TW); Mao Hui Wu, New Taipei (TW)

(73) Assignee: dadny, Inc., Taipei (TW)

( * ) Notice: Subject to any disclaimer, the term of this patent is extended or adjusted under 35 U.S.C. 154(b) by 0 days.

(21) Appl. No.: 13/666,047

(22) Filed: Nov. 1, 2012

(65) Prior Publication Data

US 2013/0272675 A1 Oct. 17, 2013

(30) Foreign Application Priority Data

Apr. 13, 2012 (TW) .............................. 101113323 A

(51) Int. Cl.
*H04N 7/00* (2011.01)

(52) U.S. Cl.
USPC .................. 348/36; 348/37; 348/38; 348/39; 348/143; 348/148; 348/170; 348/175; 348/231.3; 348/333.01; 348/333.02; 348/333.04; 348/46; 348/47; 348/48; 348/333.06

(58) Field of Classification Search
CPC ......... G08G 1/054; G08G 1/08; G08G 1/082; G08G 1/083; G08G 1/0175; G08G 1/04; H04N 5/2254; H04N 5/2628; H04N 5/2259; G03B 37/04; G06T 3/0018
USPC ......... 348/36–39, 148, 46–48, 143, 170, 175, 348/231.3, 333.01, 333.02, 333.04, 333.06
See application file for complete search history.

(56) References Cited

U.S. PATENT DOCUMENTS

| 7,766,488 | B2 * | 8/2010 | Hirata et al. ..................... 353/70 |
| 8,164,655 | B2 * | 4/2012 | Lablans ..................... 348/231.3 |
| 2006/0171562 | A1 * | 8/2006 | Yoshida ........................ 382/104 |
| 2009/0201363 | A1 * | 8/2009 | Grossmann ..................... 348/59 |
| 2010/0134593 | A1 * | 6/2010 | Kakinami ........................ 348/43 |
| 2011/0128138 | A1 * | 6/2011 | Yamamoto et al. ............ 340/436 |
| 2012/0149432 | A1 * | 6/2012 | Lablans ..................... 455/556.1 |

* cited by examiner

*Primary Examiner* — Helen Shibru
(74) *Attorney, Agent, or Firm* — Wang Law Firm, Inc.; Li K. Wang; Stephen Hsu

(57) ABSTRACT

A driving recorder system and a coordinate positioning method thereof. The system comprises a curved image lens, an operation module, a processing module, a display module and a storage module. The curved image lens captures the curved image of the surrounding areas thereof. The operation module restores the curved image into a restored image. The processing module receives the restored image and adds time data to the restored image. The display module displays the restored image and the time data. The storage module stores the restored image and the time data.

16 Claims, 10 Drawing Sheets

DRIVING RECORDER SYSTEM AND METHOD THEREOF

CROSS-REFERENCE TO RELATED APPLICATION

This application claims the benefit of Taiwan Patent Application No. 101113323, filed on Apr. 13, 2012, in the Taiwan Intellectual Property Office, the disclosure of which is incorporated herein in its entirety by reference.

BACKGROUND OF THE INVENTION

1. Field of the Invention

The present invention generally relates to an image-recording system, in particular to a driving recorder system capable of capturing the images of the surrounding areas thereof via curved image lens and then designating the objects in the captured curved image by a coordinate system added.

2. Description of the Related Art

Due to the strong demand of the market, a variety of video recorder systems are developed one after another to satisfy the consumers, such as a monitor system, a driving recorder system and the like. However, the conventional driving recorder system can only capture the image, but cannot be used to determine the relative motion relationship between the driving recorder system and the object in the captured images. Accordingly, the function of the conventional driving recorder system is limited.

For example, when installed in a moving vehicle, the conventional driving recorder system can only capture the image in front of the vehicle and record the time data of the image, rather than determine the distance between the vehicle and an incoming vehicle, and their speeds. Accordingly, the conventional driving recorder system cannot determine the relative motion relationship with an incoming vehicle. Thus, when the vehicle with the conventional driving recorder system collides into an incoming vehicle, the image recorded by the conventional driving recorder system cannot provide enough information to verify the cause of the accident.

In addition, as the conventional driving recorder system can only capture the image in front of the vehicle, the conventional driving recorder system cannot provide the information of the surrounding areas of the vehicle. Therefore, it is the primary objective of the present invention to provide a driving recorder system capable of capturing images of the surrounding areas of the vehicle and determining the relative motion relationship with an object in the captured image.

SUMMARY OF THE INVENTION

Thus, it is the primary objective of the present invention to provide a driving recorder system and a method thereof to resolve problems that the conventional driving recorder system cannot provide enough information to verify the causes of an accident and cannot provide the information of the surrounding areas thereof.

To achieve the foregoing objective, the present invention provides a driving recorder system. The system comprises a curved image lens, an operation module, a processing module, a display module and a storage module. The curved image lens is provided for capturing the image of the surrounding areas of the driving recorder system to generate a curved image. The operation module is provided for restoring the curved image to a restored image. The processing module is provided for receiving the restored image and adding time data to the restored image. The display module is provided for displaying the restored image and the time data. The storage module is provided for storing the restored image and the time data.

To achieve the foregoing objective, the present invention further provides a coordinate positioning method. The method comprises the following steps of: capturing the image of the surrounding areas of the driving recorder system by a curved image lens to generate a curved image; restoring the curved image to a restored image by an operation module; receiving the restored image and adding time data to the restored image by a processing module; displaying the restored image and the time data by a display module; and storing the restored image and the time data by a storage module.

Preferably, the driving recorder system may further comprise a coordinate positioning module for receiving the restored image and adding a coordinate system to the restored image to generate a restored image with the coordinate system added. The processing module may receive the restored image with the coordinate system added to display and store the restored image with the coordinate system added in the display module and the storage module respectively.

Preferably, the driving recorder system may further comprise a global positioning module for providing the velocity and position data of the driving recorder system.

Preferably, the coordinate positioning module may generate the restored image with the coordinate system added according to the angular orientation of the restored image.

Preferably, the driving recorder system may further comprise a gravity sensor, wherein the gravity sensor is connected to the processing module and provided for measuring the instantaneous acceleration of the driving recorder system to provide an instantaneous velocity and displacement data.

Preferably, the processing module may calculate the relative motion relationship between the driving recorder system and at least one object according to the restored image with the coordinate system added, the time data and the velocity and position data.

Preferably, the relative motion relationship may comprise a relative velocity and a relative distance.

Preferably, the driving recorder system may further comprise an alarm module, wherein the processing module may determine whether or not to drive the alarm module to send out a warning signal according to the relative motion relationship.

The driving recorder system and the coordinate positioning method may have the following advantages:

(1) The driving recorder system according to the present invention can determine the position of each of the objects in the captured image thereof, such that the relative motion relation between the system and an object in the captured image thereof can be obtained to verify the cause of an accident.

(2) The driving recorder system according to the present invention comprises a gravity sensor and global positioning system, such that the velocity and displacement data of the driving recorder system can be determined more accurately.

(3) The driving recorder system according to the present invention can warn the user of an impending accident by a warning signal, which can effectively keep the user away from danger.

(4) The driving recorder system according to the present invention can further provide the information about the surrounding area of the system for the user by panoramic images.

(5) The driving recorder system according to the present invention can also be disposed in any locations to act as a monitor, so the system according to the present invention has a broader purpose than the conventional driving recorder system.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of the present invention will become clear by the detailed description of the following embodiments and the illustration of related drawings as follows.

The driving recorder system according to the present invention can not only be installed in a variety of vehicles, such as a car, bus, airplane or electric railcar train, but also can be disposed in any locations to act as a monitor system.

Figure 1:
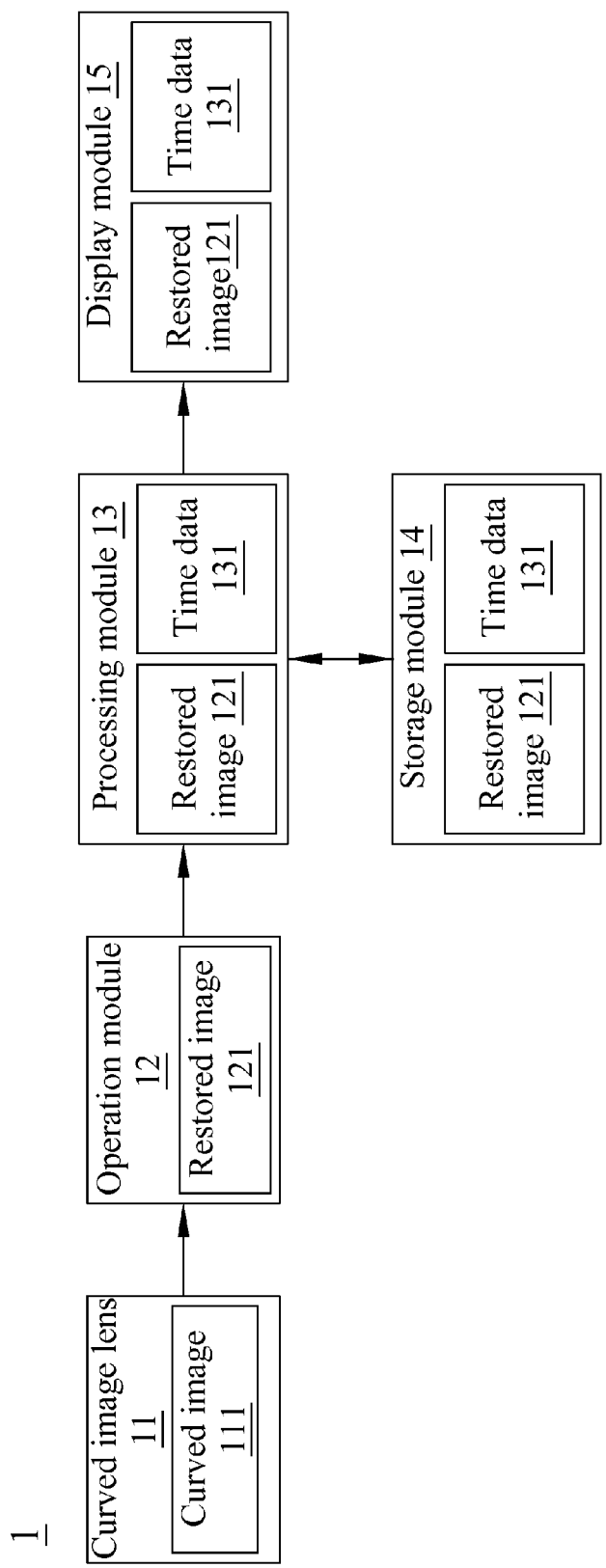
FIG. 1 is the block diagram of the driving recorder system according to the present invention.

With reference to FIG. 1 for the block diagram of the driving recorder system according to the present invention. The driving recorder system 1 comprises the curved image lens 11, the operation module 12, the processing module 13, the storage module 14 and the display module 15.

Wherein the curved image lens 11 can capture the image of the surrounding areas of the driving recorder system 1 to generate the curved image 111. The curved image 111 can be restored to the restored image 121 by the operation module 12. The processing module can receive the restored image 121 and add the time data 131 to the restored image 121. The display module 15 can display the restored image 121 and the time data 131. The storage module 14 can store the restored image 121 and the time data 131.

It is noteworthy to point out that the driving recorder system according to the present invention comprises the cured image lens capable of capturing the image of the surrounding areas of the system, such that the system can provide more information for the user. Wherein the cured image lens may be a fish-eye lens, spherical lens, funneliform lens or any lens capable of showing the surrounding areas thereof by a curved image. That is to say, when installed in a vehicle, the driving recorder system according to the present invention can not only provide the image in front of the vehicle, but also can provide the image of the surrounding areas of the vehicle. In addition, the driving recorder system according to the present invention can further restore a curved image to a restored image and store which in the storage module.

Figure 2:
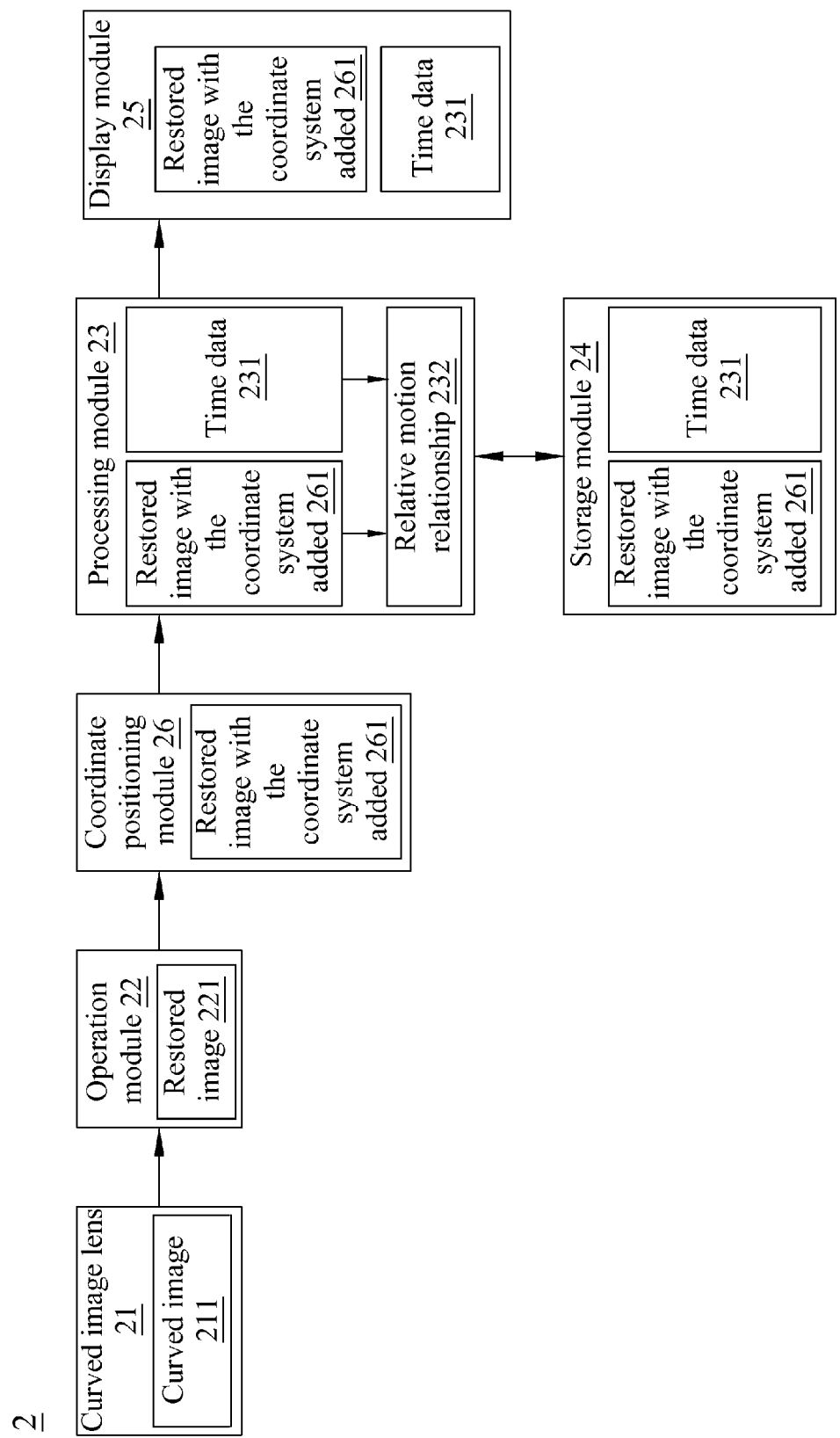
FIG. 2 is the block diagram of the first preferred embodiment of the driving recorder system according to the present invention.

With reference to FIG. 2 for the block diagram of the first preferred embodiment of the driving recorder system according to the present invention. As shown in FIG. 2, the driving recorder system 2 comprises the curved image lens 21, the operation module 22, the processing module 23, the storage module 24, the display module 25 and the coordinate positioning module 26. The curved image lens 21 is connected to the operation module 22, which can capture the image 211 of the surrounding areas thereof to generate the curved image 211 and transmit the curved image 211 to the operation module 22. The operation module 22 can receive the curved image 211 and restore the curved image 211 to the restored image 221 by way of integration and the like. The coordinate positioning module 26 can receive the restored image 221 and add a coordinate system to the restored image 221 according to the angular orientation of the restored image 221 to generate the restored image with the coordinate system added 261, such that each of the objects of the restored image 221 can be located by coordinates. The coordinate system can be rectangular coordinate system and the like. The processing module 23 may be connected to the coordinate positioning module 26. Wherein the processing module 23 can receive the restored image with the coordinate system added 261 and then generate the time data 231 for the user to read. The display module 25 can display the restored image with the coordinate system added 261 and the time data 231. Thus, the user can obtain the restored image with the coordinate system added 261, the time data 231 and the location of each of the objects of the image 261.

Besides, the processing module 23 can calculate the velocity of the system 2, the velocity of each of the objects in the image 261 and the distances between the system 2 and each of the objects in the image 261 according to the restored image with the coordinate system added 261 and the time data 231. Moreover, the processing module 23 can also calculate the velocity of the system 2 and each of the objects in the image 261 by the other ways. For example, the processing module 23 can calculate the velocity of the system 2 and each of the objects in the image 261 according to the displacements of reference points in the image 261 and the time intervals between the frames. In addition, the processing module 23 can further calculate the relative motion relationship 232 between the system 2 and each of the objects in the image 261 by the aforementioned method. The relative motion relationship 232 may comprise a relative velocity and a relative distance. Accordingly, the driving recorder system 2 according to the present invention can provide the relative motion relationship 232 with each of the objects in the image 261. The restored image with the coordinate system added 261, the time data 231 and the relative motion relationship 232 can be stored and displayed by the storage module 24 and the display module 25 respectively. In this way, when installed in a moving vehicle, the driving recorder system 2 can provide enough information to help a user verify the cause of an accident.

The conventional driving recorder system doesn't have a coordinate system, so when installed in a moving vehicle, the conventional driving recorder system cannot determine the relative motion relationship between the vehicle and an incoming vehicle. Accordingly, when an accident takes place, the conventional driving recorder system cannot help the user verify the cause of an accident, which limits the function of the conventional driving recorder system. Therefore, the present invention can actually resolve the problems of the conventional driving recorder system. Besides, as the driving recording system according to the present invention can provide the images of the surrounding areas thereof for a user by a curved lens, the user can obtain more information.

Figure 3:
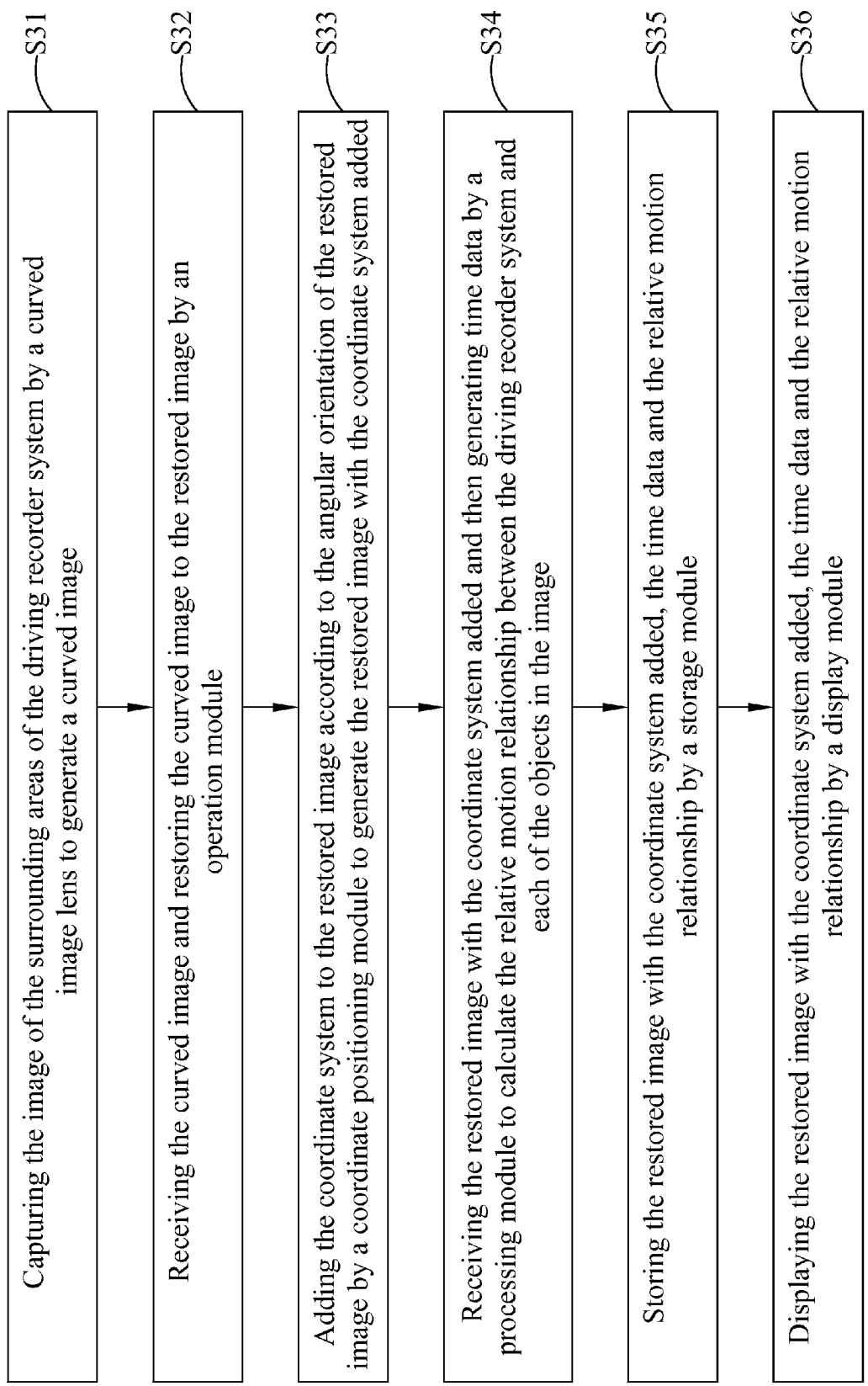
FIG. 3 is the flow chart of the first preferred embodiment of the driving recorder system according to the present invention.

With reference to FIG. 3 for the flow chart of the first preferred embodiment of the driving recorder system according to the present invention.

S31: capturing the image of the surrounding areas of the driving recorder system by a curved image lens to generate a curved image.

S32: receiving the curved image and restoring the curved image to the restored image by an operation module.

S33: adding the coordinate system to the restored image according to the angular orientation of the restored image by a coordinate positioning module to generate the restored image with the coordinate system added.

S34: receiving the restored image with the coordinate system added and then generating time data by a processing module to calculate the relative motion relationship between the driving recorder system and each of the objects in the image.

S35: storing the restored image with the coordinate system added, the time data and the relative motion relationship by a storage module.

S36: displaying the restored image with the coordinate system added, the time data and the relative motion relationship by a display module.

Figure 4:
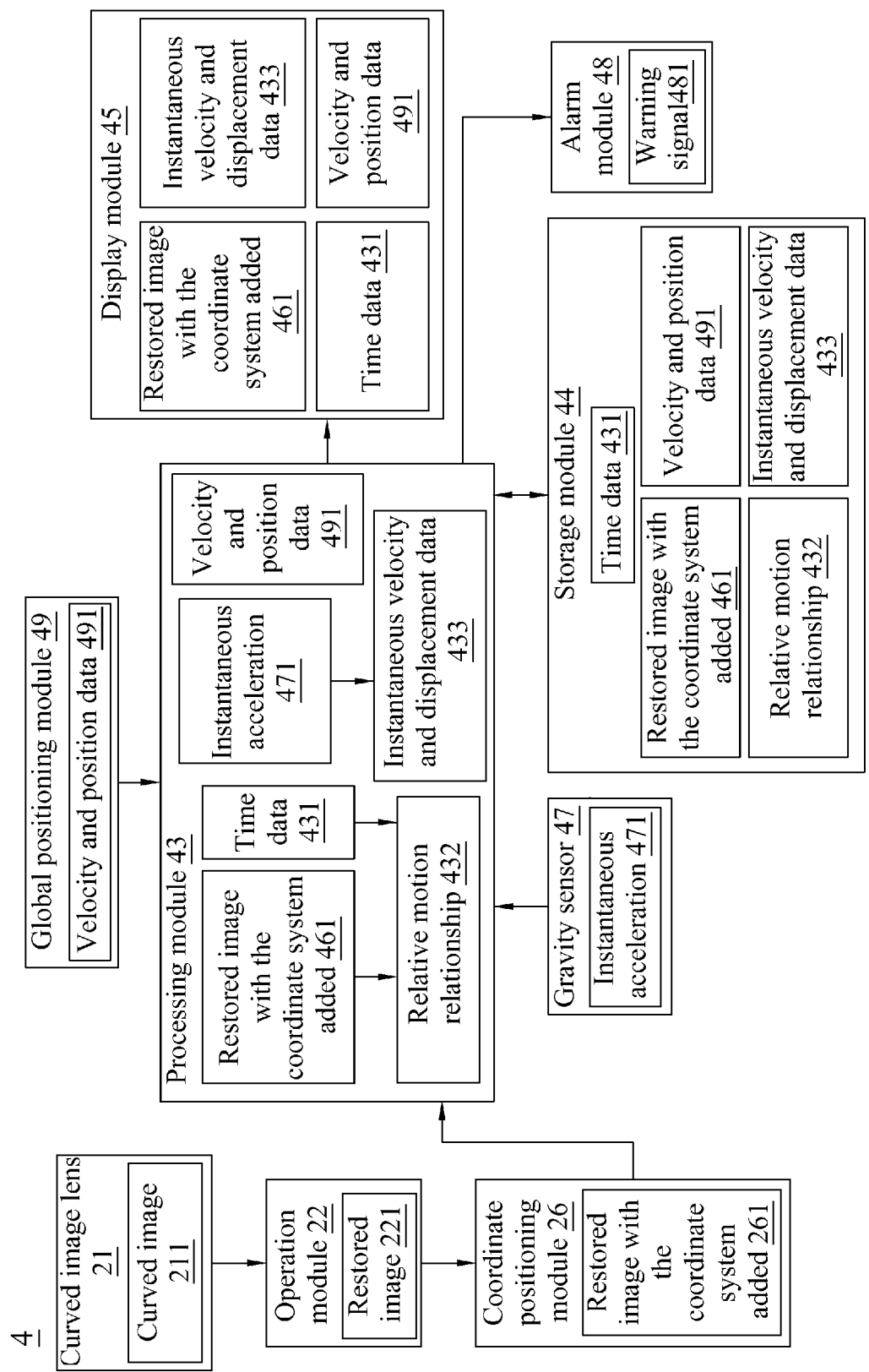
FIG. 4 is the block diagram of the second preferred embodiment of the driving recorder system according to the present invention.

With reference to FIG. 4 for the block diagram of the second preferred embodiment of the driving recorder system according to the present invention. As shown in FIG. 4, the driving recorder system 4 comprises the curved image lens 41, the operation module 42, the processing module 43, the storage module 44, the display module 45, the coordinate positioning module 46, the gravity sensor 47 and the alarm module 48.

Similarly, the curved image lens 41 can capture the image of the surrounding areas thereof to generate the curved image 411. The operation module 42 can restore the curved image 411 to the restored image 421. The coordinate positioning module 46 can add a coordinate system to the restored image 421 to generate the restored image with the coordinate system added 461. The processing module 43 can calculate the relative motion relationship 432 between the system 4 and each of the objects in the image 461 according to the restored image with the coordinate system added 461 and the time data 431. Next, the processing module 43 can transmit the restored image with the coordinate system added 461, the time data 431 and the relative motion relationship 432 to the storage module 44 and the display module 45.

In this embodiment, the driving recorder system 4 further comprises the gravity sensor 47, the alarm module 48 and the global positioning module 49. The instantaneous acceleration 471 of the driving recorder system 4 can be determined by the gravity sensor 47. The processing module 43 can accurately calculate the instantaneous velocity and displacement data 433 of the driving recorder system 4 according to the instantaneous acceleration 471 and transmit which to the storage module 44 and the display module 45. Besides, the global positioning module 49 can also accurately provide the velocity and position data 491 of the driving recorder system 4. In this way, when installed in a moving vehicle, the driving recorder system 4 can help a user obtain the instantaneous velocity and displacement data 433 of the vehicle at the moment that an accident happened.

On the other hand, as the driving recorder system 4 can determine the relative motion relationship 432 with each of the objects in the image 461, the processing module 43 can determine whether or not to drive the alarm module 48 to send out the warning signal 481 to the user according to the relative motion relationship 432 so as to prevent the user from accidents.

For example, when the driving recorder system 4 is installed in a moving vehicle, the processing module 43 can determine the relative velocity and the relative distance between the vehicle and an incoming vehicle according to the restored image with the coordinate system added 461, reference points in the image 461 and the time data 431. When the relative velocity or the relative distance between the vehicle and the incoming vehicle exceeds a predetermined threshold, the processing module 43 drives the alarm module 48 to send out the warning signal 481 to warn the user of an accident in order to help the user avoid the accident. That is to say, the driving recorder system 4 can not only help the user verify the cause of an accident after the accident happened, but also can warn the user to avoid the accident before the accident happens.

It is noteworthy to point out that the conventional driving recorder system doesn't have a coordinate system and a gravity sensor, so the conventional driving recorder system cannot provide enough information to help a user verify the cause of an accident. However, as comprising a gravity sensor, the driving recorder system according to the present invention can provide instantaneous velocity and displacement data of the vehicle at the moment that an accident happened for the user. Thus, the driving recorder system according to the present invention can provide more original data for the user to help the user verify the cause of the accident.

Furthermore, the driving recorder system according to the present invention can further determine whether or not to warn the user to slow down his car or brake his car immediately in order to prevent from an accident. Thus, the driving recorder system according to the present invention can actually improve the conventional driving recorder system.

Figure 5:
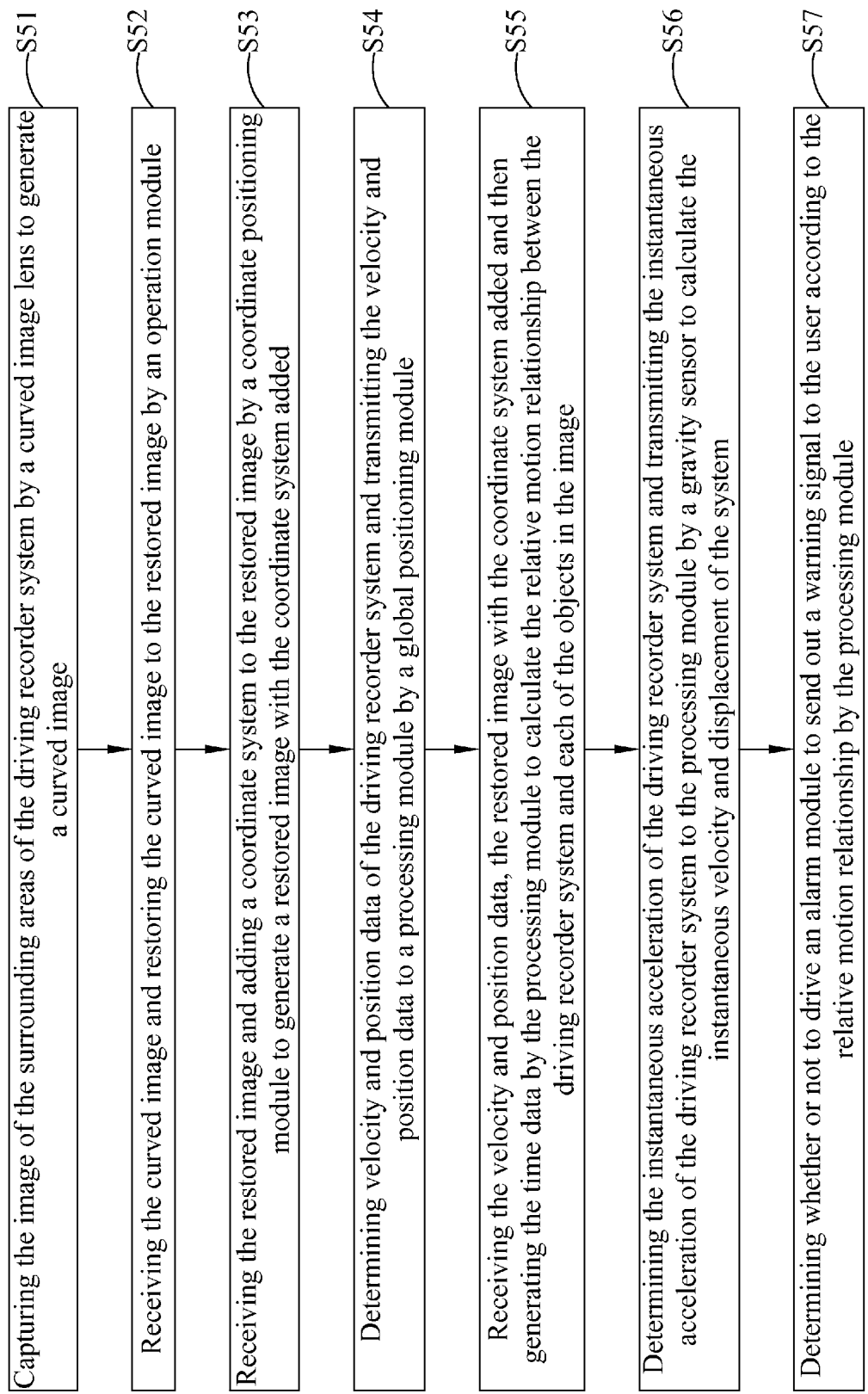
FIG. 5 is the flow chart of the second preferred embodiment of the driving recorder system according to the present invention.

With reference to FIG. 5 for the flow chart of the second preferred embodiment of the driving recorder system according to the present invention.

S51: capturing the image of the surrounding areas of the driving recorder system by a curved image lens to generate a curved image.

S52: receiving the curved image and restoring the curved image to the restored image by an operation module.

S53: receiving the restored image and adding a coordinate system to the restored image by a coordinate positioning module to generate a restored image with the coordinate system added.

S54: determining velocity and position data of the driving recorder system and transmitting the velocity and position data to a processing module by a global positioning module.

S55: receiving the velocity and position data, the restored image with the coordinate system added and then generating the time data by the processing module to calculate the relative motion relationship between the driving recorder system and each of the objects in the image.

S56: determining the instantaneous acceleration of the driving recorder system and transmitting the instantaneous acceleration of the driving recorder system to the processing module by a gravity sensor to calculate the instantaneous velocity and displacement of the system.

S57: determining whether or not to drive an alarm module to send out a warning signal to the user according to the relative motion relationship by the processing module.

Figure 6A:
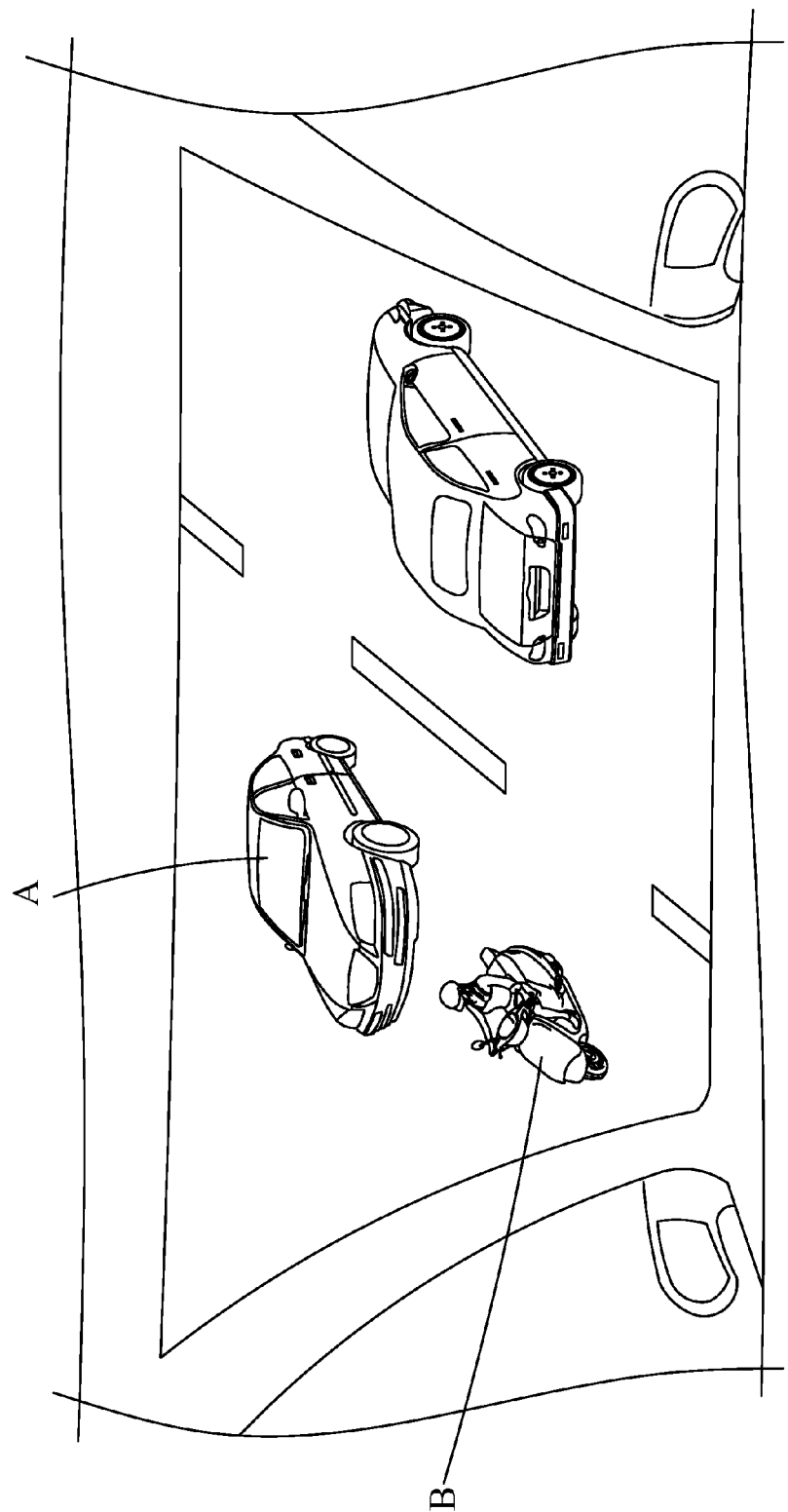
FIG. 6A and FIG. 6B are the schematic views of the third preferred embodiment of the driving recorder system according to the present invention.
Figure 6B:
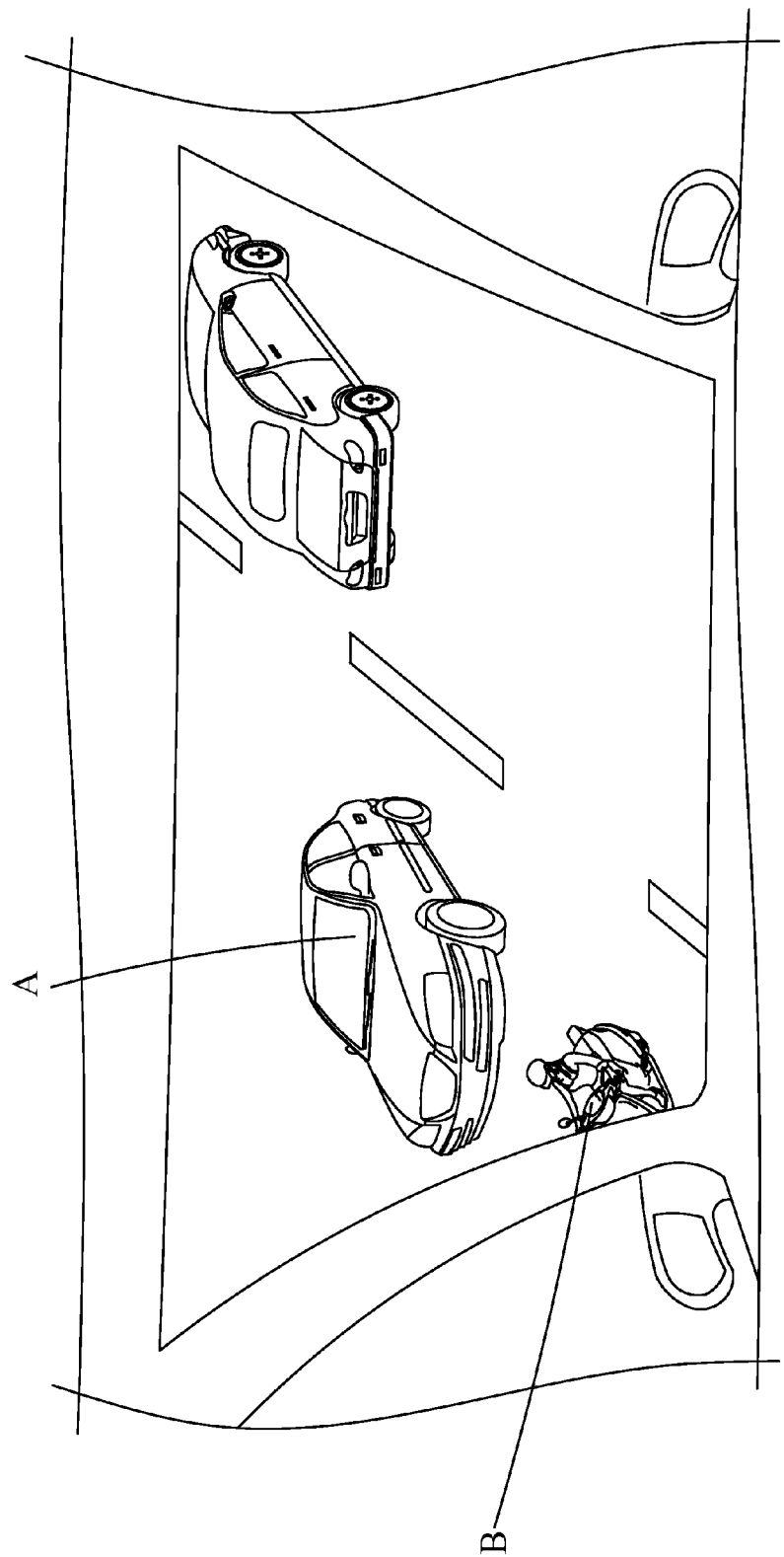

Please refer to FIG. 6A and FIG. 6B. FIG. 6A and FIG. 6B are the schematic views of the third preferred embodiment of the driving recorder system according to the present invention. As shown in FIG. 6A, as using a curved lens to capture image, the driving recorder system according to the present invention can provide panoramic images for the user. In this embodiment, the image captured by the driving recorder system comprises the scooter A and the car B. As shown in FIG. 6B, after a period of time, the scooter A and the car B moved. However, the driving recorder system according to the present invention can locate the objects in captured images by coordinates, so the system can calculate the velocities of the scooter A and the car B by a lot of ways. For example, the driving recorder system can calculate the velocities of the scooter A and the car B by analyzing their coordinates at different time and the time interval between frames (such as 30 frames per second). In addition, the velocity of the driving recorder system can be obtained by the same way or provided by the global positioning module.

Figure 7:
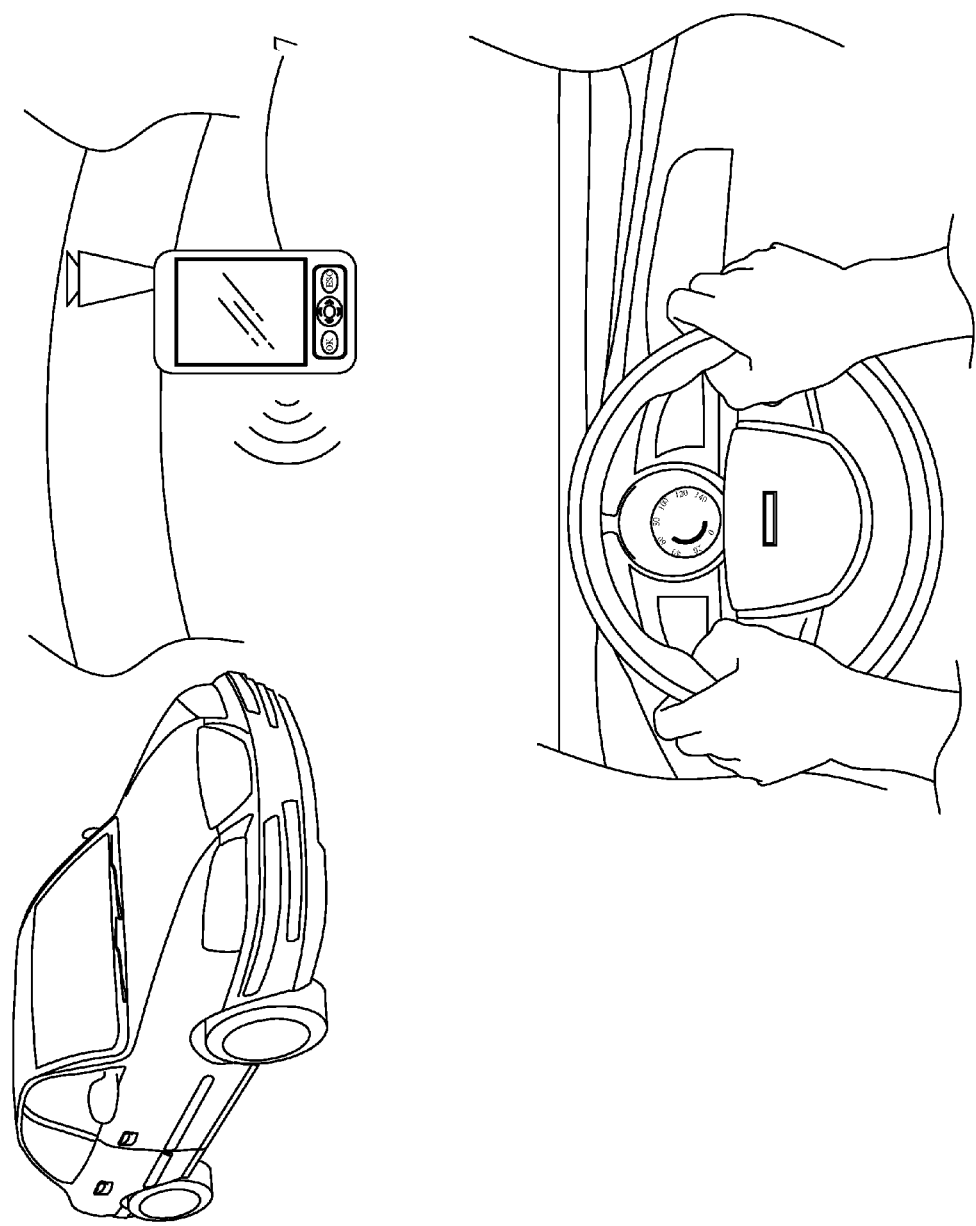
FIG. 7 and FIG. 8 are the schematic views of the forth preferred embodiment of the driving recorder system according to the present invention.

With reference to FIG. 7 for the schematic view of the forth preferred embodiment of the driving recorder system according to the present invention. As shown in FIG. 7, the driving recorder system 7 uses a curved lens to capture the images of the surrounding areas thereof. As being able to accurately calculate the relative motion relationship with an incoming car, the driving recorder system can warn the driver of an impending accident by a warning signal, which allows the driver to have enough time to take the necessary action to prevent from the accident.

Figure 8:
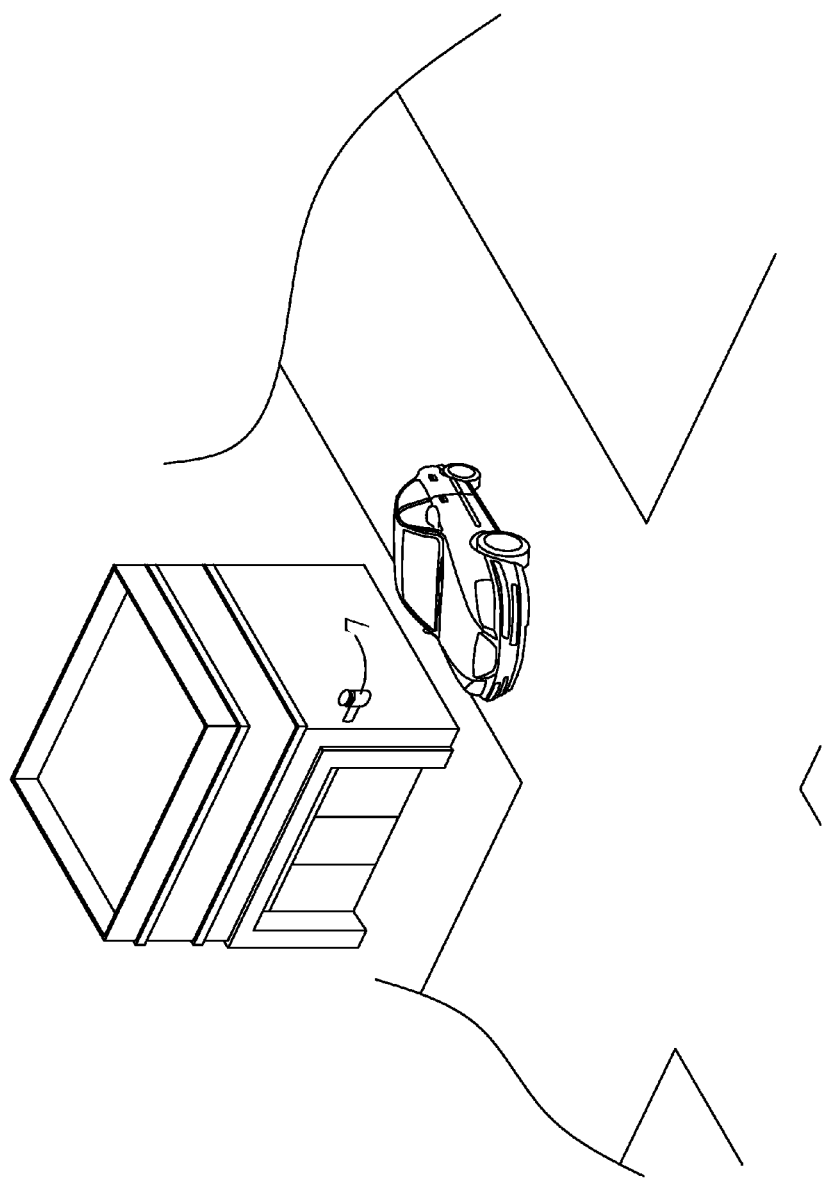

The driving recorder system 7 can no only be installed in various vehicles, such as a car, bus, airplane, electric railcar train and the like, but also can be disposed in a dwelling house, office building, factory, apartment, bank and the like to act as a monitor system, as shown in FIG. 8.

Although the above description about the driving recorder system in accordance with the present invention has illustrated the concept of the coordinate positioning method in accordance with the present invention, the following still provides the flow chart to specify the coordinate positioning method in accordance with the present invention.

Figure 9:
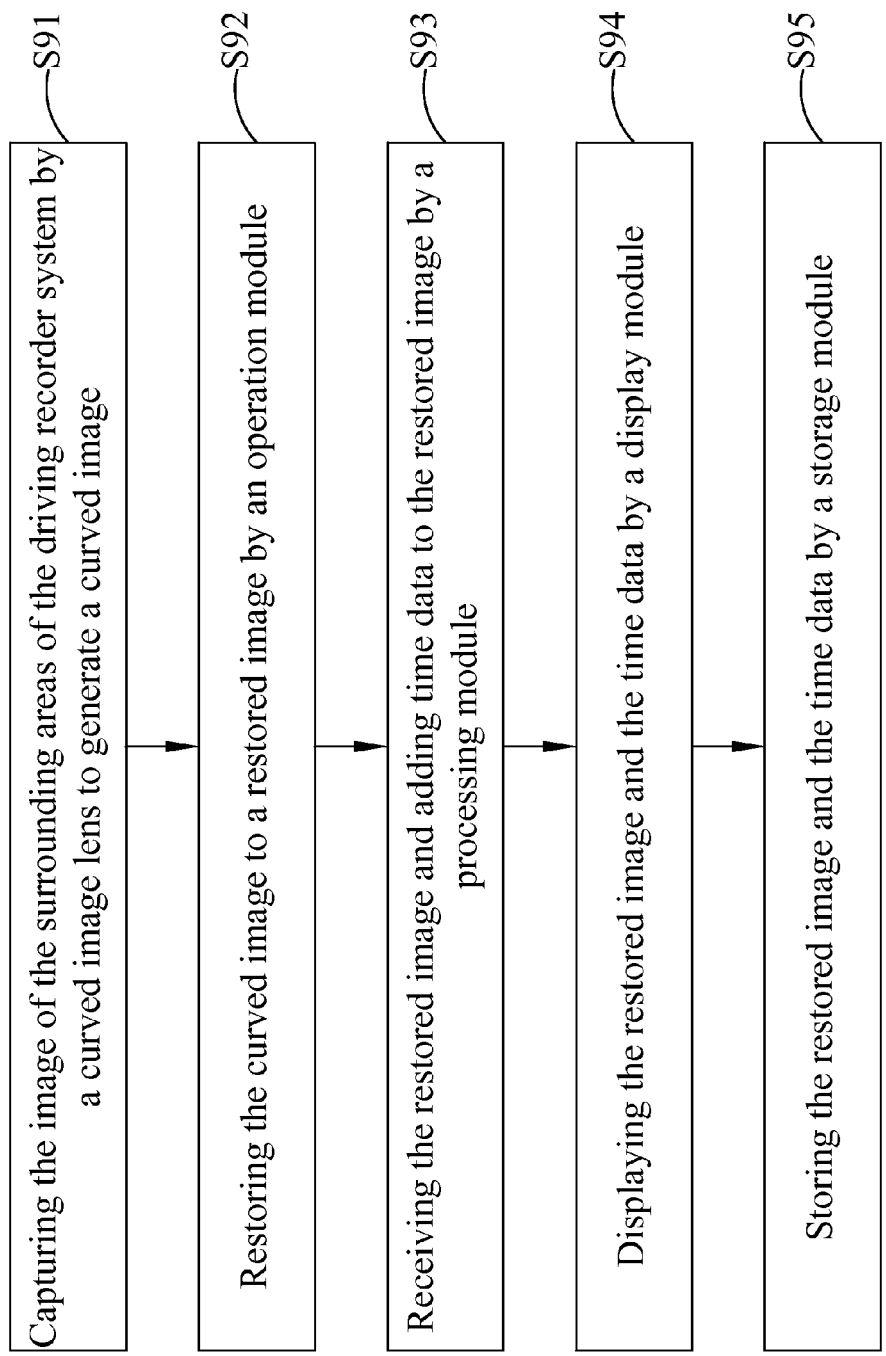
FIG. 9 is the flow chart of the coordinate positioning method according to the present invention.

With reference to FIG. 9 for the flow chart of the coordinate positioning method according to the present invention. The method comprises the following steps of:

S91: capturing the image of the surrounding areas of the driving recorder system by a curved image lens to generate a curved image.

S92: restoring the curved image to a restored image by an operation module.

S93: receiving the restored image and adding time data to the restored image by a processing module.

S94: displaying the restored image and the time data by a display module.

S95: storing the restored image and the time data by a storage module.

The detailed description and the exemplary embodiments of the coordinate positioning method in accordance with the present invention have been described in the description of the driving recorder system in accordance with the present invention; therefore, they will not be repeated herein again.

In summation of the description above, the driving recorder system according to the present invention can determine the position of each of the objects in the captured image thereof, such that the relative motion relation between the system and an object in the captured image thereof can be obtained to verify the cause of an accident. The driving recorder system according to the present invention comprises a gravity sensor and global positioning system, such that the velocity and displacement data of the driving recorder system can be determined more accurately. In addition, the driving recorder system according to the present invention can warn the user of an impending accident by a warning signal, which can effectively keep the user away from danger. Also, the driving recorder system according to the present invention can further provide the information about the surrounding area of the system for the user by panoramic images. Moreover, the driving recorder system according to the present invention can also be disposed in any locations to act as a monitor, so the system according to the present invention has a broader purpose than the conventional driving recorder system. Accordingly, the driving recorder system according to the present invention can actually resolve the problems of the conventional driving recorder system.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A driving recorder system, comprising:
a curved image lens, arranged for capturing an image of surrounding areas of the driving recorder system to generate a curved image;
an operation module, arranged for restoring the curved image to a restored image;
a coordinate positioning module, arranged for receiving the restored image and adding a coordinate system to the restored image to generate a restored image with the coordinate system added;
a processing module, arranged for receiving the restored image with the coordinate system added and adding time data to the restored image with the coordinate system added;
a display module, arranged for displaying the restored image with the coordinate system added and the time data; and
a storage module, arranged for storing the restored image with the coordinate system added and the time data.

2. The driving recorder system of claim 1, further comprising a global positioning module, arranged for providing velocity and position data of the driving recorder system.

3. The driving recorder system of claim 1, further comprising a gravity sensor, wherein the gravity sensor is connected to the processing module and provided for measuring an instantaneous acceleration of the driving recorder system to provide an instantaneous velocity and displacement data.

4. The driving recorder system of claim 1, wherein the coordinate positioning module generates the restored image with the coordinate system added according to an angular orientation of the restored image.

5. The driving recorder system of claim 2, further comprising a gravity sensor, wherein the gravity sensor is connected to the processing module and provided for measuring an instantaneous acceleration of the driving recorder system to provide an instantaneous velocity and displacement data.

6. The driving recorder system of claim 2, wherein the processing module calculates a relative motion relationship between the driving recorder system and at least one object according to the restored image with the coordinate system added, the time data and the velocity and position data.

7. The driving recorder system of claim 6, wherein the relative motion relationship comprises a relative velocity and a relative distance.

8. The driving recorder system of claim 6, further comprising an alarm module, wherein the processing module determines whether or not to drive the alarm module to send out a warning signal according to the relative motion relationship.

9. A coordinate positioning method, applicable to a driving recorder system and comprising the steps of:
   capturing an image of surrounding areas of the driving recorder system by a curved image lens to generate a curved image;
   restoring the curved image to a restored image by an operation module;
   receiving the restored image and adding a coordinate system to the restored image by a coordinate positioning module to generate a restored image with the coordinate system added;
   receiving the restored image with the coordinate system added and adding time data to the restored image with the coordinate system added by a processing module;
   displaying the restored image with the coordinate system added and the time data by a display module; and
   storing the restored image with the coordinate system added and the time data by a storage module.

10. The coordinate positioning method of claim 9, further comprising the step of:
   providing velocity and position data of the driving recorder system by a global positioning system.

11. The coordinate positioning method of claim 9, furthering comprising the step of:
   generating the restored image with the coordinate system added according to an angular orientation of the restored image by the coordinate positioning module.

12. The coordinate positioning method of claim 9, furthering comprising the step of:
   determining an instantaneous acceleration of the driving recorder system by a gravity sensor.

13. The coordinate positioning method of claim 10, furthering comprising the step of:
   determining an instantaneous acceleration of the driving recorder system by a gravity sensor.

14. The coordinate positioning method of claim 10, furthering comprising the step of:
   calculating a relative motion relationship between the driving recorder system and at least one object according to the restored image with the coordinate system added, the time data and the velocity and position data by the processing module.

15. The coordinate positioning method of claim 14, wherein the relative motion relationship comprises a relative velocity and a relative distance.

16. The coordinate positioning method of claim 14, furthering comprising the step of:
   determining whether or not to drive an alarm module to send out a warning signal according to the relative motion relationship by the processing module.

* * * * *